(12) United States Patent
Carini et al.

(10) Patent No.: US 8,375,035 B2
(45) Date of Patent: Feb. 12, 2013

(54) VISUAL AID TO ASSIST MAKING PURCHASE BY TRACKING KEY PRODUCT CHARACTERISTICS

(75) Inventors: Robert L. Carini, San Carlos, CA (US); Kannan Balakishnan, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 193 days.

(21) Appl. No.: 12/858,201

(22) Filed: Aug. 17, 2010

(65) Prior Publication Data
US 2012/0047146 A1   Feb. 23, 2012

(51) Int. Cl.
*G06F 17/30* (2006.01)
(52) U.S. Cl. ........ 707/748; 707/752; 715/804; 705/26.8
(58) Field of Classification Search ........................ None
See application file for complete search history.

(56) References Cited

U.S. PATENT DOCUMENTS

| | | | | |
|---|---|---|---|---|
| 4,291,828 A * | 9/1981 | Nigro | ............................ | 229/117 |
| 4,307,821 A * | 12/1981 | McIntosh | ........................ | 222/83 |
| 4,784,888 A * | 11/1988 | Schwertner et al. | ............ | 428/67 |
| 4,830,208 A * | 5/1989 | Osting et al. | ................. | 215/252 |
| 4,848,615 A * | 7/1989 | Friedrich | ...................... | 215/254 |
| 4,921,563 A * | 5/1990 | Schwertner et al. | ....... | 156/303.1 |
| 5,022,844 A * | 6/1991 | Schwertner et al. | ....... | 425/302.1 |
| 5,592,375 A * | 1/1997 | Salmon et al. | ................ | 705/321 |
| 5,783,266 A * | 7/1998 | Gehrke | ........................ | 428/34.3 |
| 5,839,627 A * | 11/1998 | Hicks et al. | ................ | 222/541.9 |
| 5,947,296 A * | 9/1999 | Castora | .......................... | 206/571 |
| 5,950,172 A * | 9/1999 | Klingman | ................... | 705/27.1 |
| 5,974,910 A * | 11/1999 | Paykin et al. | ................ | 74/606 R |
| 6,088,686 A * | 7/2000 | Walker et al. | ................... | 705/38 |
| 6,401,118 B1 * | 6/2002 | Thomas | ........................ | 709/224 |
| 6,636,860 B2 * | 10/2003 | Vishnubhotla | ................ | 707/600 |
| 6,799,181 B2 * | 9/2004 | Vishnubhotla | ........................ | 1/1 |
| 6,816,464 B1 * | 11/2004 | Scott et al. | .................... | 370/252 |
| 6,820,089 B2 * | 11/2004 | Vishnubhotla | ........................ | 1/1 |
| 6,853,982 B2 * | 2/2005 | Smith et al. | .................. | 705/26.7 |
| 7,016,866 B1 * | 3/2006 | Chin et al. | ................... | 705/26.7 |
| 7,080,071 B2 * | 7/2006 | Henrion et al. | ............... | 707/713 |
| 7,246,113 B2 * | 7/2007 | Cheetham et al. | ............ | 707/741 |
| 7,283,990 B2 * | 10/2007 | Goetz | ........................... | 718/100 |
| 7,287,017 B2 * | 10/2007 | Pellinat | ........................... | 706/59 |
| 7,330,844 B2 * | 2/2008 | Stoyen | ............................ | 706/60 |
| 7,359,898 B1 * | 4/2008 | Acton et al. | ........................ | 1/1 |
| 7,398,279 B2 * | 7/2008 | Muno et al. | ........................ | 1/1 |
| 7,418,447 B2 * | 8/2008 | Caldwell et al. | ............. | 705/26.1 |
| 7,542,919 B1 * | 6/2009 | Mueller et al. | .................. | 705/16 |

(Continued)

*Primary Examiner* — Farhan Syed
(74) *Attorney, Agent, or Firm* — Kilpatrick Townsend & Stockton LLP

(57) ABSTRACT

The present invention is directed to methods and systems for assisting users in an ecommerce environment. The method includes displaying a user interface of including products. Each of the products have associated attributes. Each of the associated attributes are displayed in the user interface with an associated selection tool. The method further includes receiving one or more selections of the selection tools indicating selection of one or more of the associated attributes. The one or more selections provide a ranking of each of the selected attributes. For each of the products, the method calculates a real-time score total and displays the real-time score total within the user interface. The calculating includes determining a weighted value for each of the products based on an aggregation of each of the selected associated attributes of the product. Further, the method includes displaying a ranked list of the products based on the determined weighted values of each of the products.

13 Claims, 9 Drawing Sheets

U.S. PATENT DOCUMENTS

| | | | |
|---|---|---|---|
| 7,552,045 B2* | 6/2009 | Barliga et al. | 704/8 |
| 7,747,736 B2* | 6/2010 | Childress et al. | 709/224 |
| 8,103,691 B2* | 1/2012 | Chunilal | 707/769 |
| 2002/0004739 A1* | 1/2002 | Elmer et al. | 705/10 |
| 2002/0010625 A1* | 1/2002 | Smith et al. | 705/14 |
| 2002/0082945 A1* | 6/2002 | Tenorio | 705/27 |
| 2003/0004760 A1* | 1/2003 | Schiff et al. | 705/5 |
| 2004/0220834 A1* | 11/2004 | Pellinat | 705/2 |
| 2004/0249719 A1* | 12/2004 | Urpani | 705/26 |
| 2005/0071216 A1* | 3/2005 | Yoshitake et al. | 705/10 |
| 2007/0067225 A1* | 3/2007 | Fabris et al. | 705/26 |
| 2007/0130088 A1* | 6/2007 | Kern et al. | 705/400 |
| 2008/0077506 A1* | 3/2008 | Rampell et al. | 705/27 |
| 2008/0077609 A1* | 3/2008 | Ronen | 707/102 |
| 2008/0178197 A1* | 7/2008 | Pape et al. | 719/318 |
| 2009/0222328 A1* | 9/2009 | Figueroa et al. | 705/10 |
| 2010/0185640 A1* | 7/2010 | Dettinger et al. | 707/758 |
| 2011/0106594 A1* | 5/2011 | Shirey | 705/14.4 |
| 2011/0145279 A1* | 6/2011 | Chunilal | 707/769 |
| 2011/0246483 A1* | 10/2011 | Darr et al. | 707/748 |
| 2012/0047146 A1* | 2/2012 | Balakrishnan et al. | 707/748 |

* cited by examiner

Figure 5

VISUAL AID TO ASSIST MAKING PURCHASE BY TRACKING KEY PRODUCT CHARACTERISTICS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Currently, online shopping and ecommerce environments suffer from a variety of shortcomings. For example, when a consumer searches for a product (e.g., a handbag) the search results may return a large number of results (i.e., 20 to 30 items) for which the consumer must then browse through to make their decision. Typically, such results are displayed in a single webpage display, and so the consumer is often inundated with too much information (or products) with many variables and attributes, and no real way to make a valid decision on which product to purchase. For example, price may be the deciding factor, material type, quality of material, color, brand, etc. There are a number of factors that are to be considered when making a purchasing decision, and unfortunately current ecommerce systems fail to provide any adequate solutions.

Furthermore, in current ecommerce systems there is no way to highlight important attributes automatically, adequately score products, and collaborate with other consumers and peers in making a product selections. These and other shortcomings in the current ecommerce systems indicate that improvements in the art are needed.

SUMMARY OF THE INVENTION

Aspects of the present invention include a scoring feature for product selection and shopping. This scoring may allow users to place a ranking of importance against product features deemed as critical (or important) when considering a product for purchase. When a user is reviewing several products in a side-by-side comparison mode, the scoring feature enables the user to place a selection against any of the product features which are of significance. This means that the product feature is of importance to the decision making process when making a purchase. As the user reviews and rates the product features for the products being compared, scoring keeps a running total of those important product features. Finally, when the user is ready to purchase a product or products, and add them to, for example, a shopping cart, the scoring assists the decision making process by displaying a cumulative score for each product being compared. Thus, assisting the user with a visual summary "scorecard".

For example, if a user is comparing five products, and product number three has a higher score than the other four products being compared, then the user can use this ranking as a purchasing criteria. Seeing that product number three has the most desired features during the product comparison experience, the user can be guided to purchase product number three based on the total scoring.

Furthermore, the user, whether a business-to-business (B2B) or business-to-consumer (B2C) user, has access to the scoring feature within a product comparison facility. The user has the ability to select several products, invoke the product comparison facility, and score the product features of importance before making a purchase. Within the product comparison facility, the user can enable the scoring feature, allowing the user to place a check mark against the product features they feel are most important to them as they decide to make a product purchase. As the user scores features against the product attributes that are important, a total score is displayed in the top most section of the product comparison page. If the user would like to remove the scores and start the scoring process over, the user has the ability to select a refresh button which will refresh all scoring values (this would clear the scoring checkboxes and allow the user to being a new scoring session).

Additionally, the scoring feature may be embedded within a product comparison facility. If an administrator decides to enable the product comparison for a given product catalog page, then the scoring feature would be available within the product comparison facility. Furthermore, aspects of the present invention may include user interfaces. The scoring feature can be toggled on and off at the user's discretion during the product comparison session. The user has the ability to click on the scoring icon to easily enable the scoring feature. Upon enabling scoring, checkboxes may be displayed next to each product feature, allowing the user to place a selection checkmark against the product feature they feel are of most importance to them when purchasing a product. A running total for scoring keeps track of the product features selected (this may be displayed in the product comparison area where the user can select the product to purchase and its quantity). Thus, this easily allows the user to rate the product features that are of most importance and assist the user in the purchasing decision making process.

When reviewing and evaluating many products during the product comparison process, the user can leverage the scoring feature to help track and identify important attributes that are key to the product purchasing decision. The user does not need to remember the products that have significant features (the scoring feature tracks the user selections and shows the total for each product). This is very useful when comparing a large number of features across many products. The user can also clear the scoring by selecting a refresh all values icon located in the product comparison toolbar, which resets the total score and scoring check boxes, thus allowing the user to begin a new scoring session.

BRIEF DESCRIPTION OF THE DRAWINGS

FIG. 5 is a simplified block diagram illustrating a graphical user interface 500, according to a further embodiment of the present invention.

DETAILED DESCRIPTION OF THE INVENTION

Figure 1:
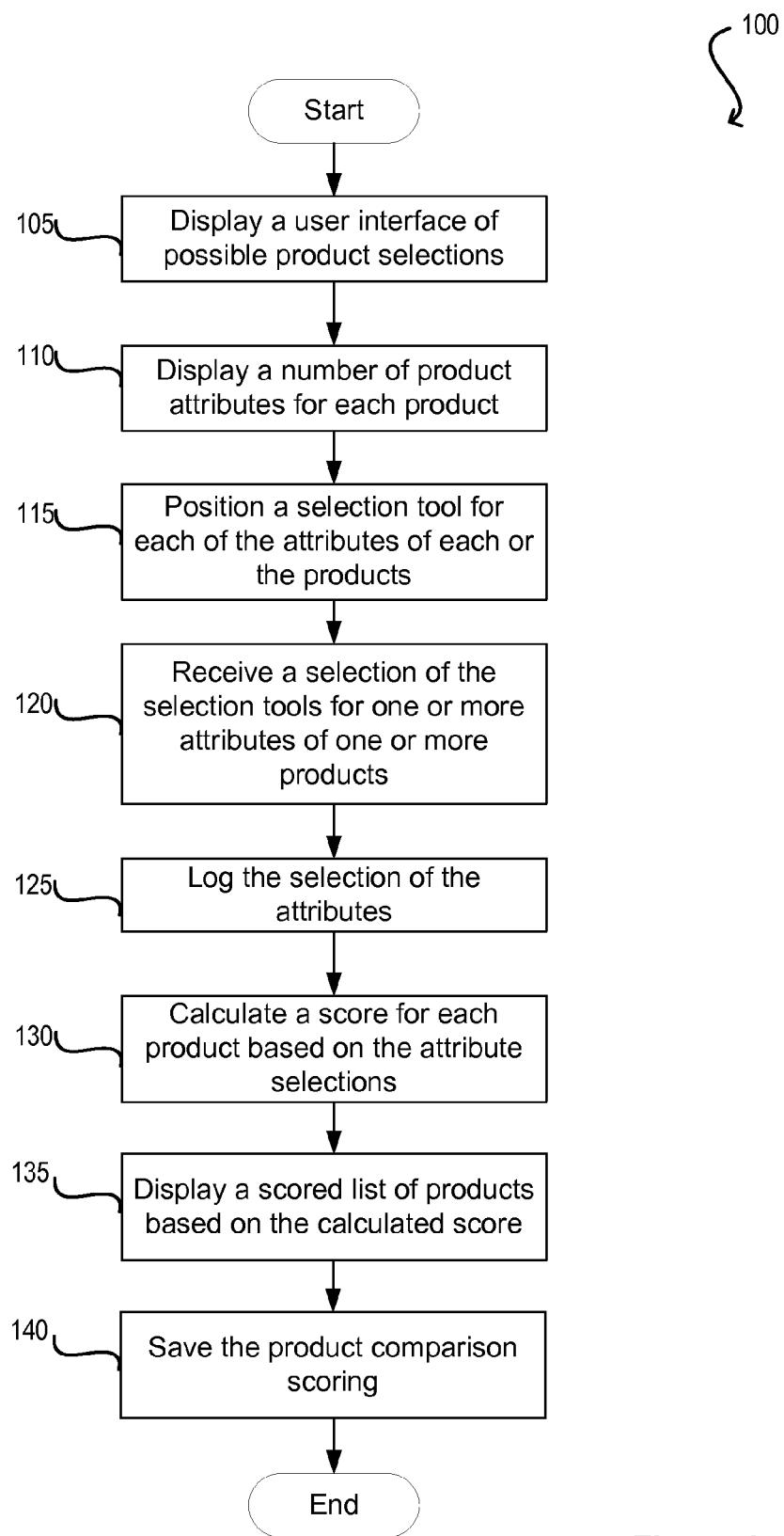
FIG. 1 is a simplified flow diagram illustrating a method 100, according to an embodiment of the present invention.

The present invention is directed to assisting consumers in making product purchasing decisions by tracking key product characteristics, thus, helping to guide a consumers decision making process. Further aspects of the invention include scoring products and attributes automatically, providing collaboration with other consumers and peers in the decision making process, and ultimately provide a consumer with guided product searching capabilities.

Furthermore, aspects of the present invention allows for consumers to select products of interest, compare their attributes side by side, and indicate which product features are of most importance by scoring them appropriately. Users are able to browse and select products over the internet, place them in a shopping cart, and then place orders electronically. The scoring aspects of the present invention utilize a product comparison user interface which enables users to identify products that are important when making an online purchasing decision. Specifically, end users can toggle the scoring feature on or off When enabled, a total product score counter appears, and a checkbox (or slider) may be displayed next to each product feature, thus allowing the user to place a checkmark against the desired feature (or attribute). As the user selects the scoring checkbox, the total score for that particular product is incremented, for example, by one; de-selecting the scoring checkbox decrements the total score by one. The total scores for each product can then be compared and used to make a weighted purchasing decision.

Additionally, the end user has the ability to save the comparisons with the scoring as a named product scoring entry, and the ability to persist and share the score. The end user may name the product scoring entry with any unique name or as an auto-generated name based at least in part on the comparisons within the product scoring entry. In one embodiment, this allows for multiple users to collaborate and pick the best (or most suitable) product. The present invention provides automatic scoring based on user preferences, previous purchases by the current user, and based on purchase patterns from other users.

As such, an administrator should be able to define product item attributes that can be compared. This may be accomplished as a set-up prior to enabling the product comparison feature, in order to compare like product item attributes the products that can be placed side-by-side may be grouped by catalog section within the interface. As a user navigates from one section to the next, the context of products that can be compared may also change. The user interface to support the product comparison feature should provide an intuitive set of controls, allowing for ease of user interaction when dealing with a large list of product item attributes to compare. User should also have the ability to select the products and their quantities while on the product comparison page, and then return back to a current shopping cart, or the like with the items that have been chosen. This should allow for a more streamlined checkout process.

In one embodiment, users may be able to select two or more items from, for example, a product catalog and then invoke a compare feature function that would display product images and pre-specified item attributes/catalog components with field labels. The compare feature function could also allow for multiple different template types to be assigned to products. Setups may include meta-data that should be used in the product compare feature function (i.e., which fields should be included for product comparison).

Furthermore, both business-to-business (B2B) and business-to-consumer (B2C) users will have the ability to select two or more products from a product catalog for inclusion in the product comparison feature. Many templates that display products may support single-line display, multi-line display, and product detail display templates which can show product catalog information and provide an add to cart capabilities.

For a single-line template, the interface may display product catalog information in a line-by-line fashion, and the user would be able to select the product(s) on a line by line basis for comparison. For a multi-line template, the interface may display product catalog information in a tabular fashion, the user should be able to select the product(s) for comparison. Further, for a product detail template, the interface may display product catalog detail information for one product, the user should be able to select that product for comparison.

The comparison interface may include a product comparison page which displays the product items selected from the single line, multi-line, or product detail selection page. Product comparisons may be displayed on a separate page (or the same page) in the same session, and include product information available (such as price, images, descriptions, section name, etc.) and pre-defined content as defined by an administrator. A toolbar menu may also be available at, for example, the top and bottom of the product comparison page, thus allowing the user to easily perform functions such as print, screen refresh, return back to shopping, etc. The toolbar menu may also display a function with a mouse-over as the user places their cursor over the functional icons.

Furthermore, product information and pre-defined content may appear in separate regions on the product comparison page and attributes may be seeded; however, an administrator may have the ability to decide pre-defined content that should be included for comparison. The product information pre-defined content coming from additional product extended attributes may be definable by the administrator. Extended attribute group names should appear as collapsible section headers and their related product extended attributes may be displayed below the header name.

Columns displaying product information may allow the user to re-order the desired columns from left to right by dragging and dropping the columns. The user may also have the ability to hide and show any of the product columns. The user may further have the ability to print the contents being displayed on the product comparison page. The user may have the ability to cancel out of the product comparison page and return back to the calling section, and returning back to the calling page without saving any changes.

Additionally, the user should have the ability to select any of the items being compared and assign a score to the product features that may be relevant and most desired. This will help the user to possibly decide on which product(s) to purchase by reviewing a tally of features that are deemed most important to the user. The individual scores may be available for all product features, with an overall total score that tallies the individual scores. The user may be able to selectively turn scoring on or off from the toolbar menu. For example, upon entering the product comparison page, the product score total should be hidden, and the user can click on the score on/off toggle icon, in order to use the product score feature. When enabled, a total product score counter may appear in the first table, and a checkbox (or slider) next to each product feature should be displayed, thus allowing the user to place a checkmark against the desired feature. As the user selects the checkbox, the total score for that particular product may be increment by one, whereas de-selecting the checkbox may decrement the total score.

Turning now to FIG. 1, which illustrates a method 100, according to an embodiment of the present invention. At process block 105, a user interface is configured to display a number of possible product selections. In one embodiment, the user interface may be similar to the user interface depicted in FIG. 5 or 6. Furthermore, the products displayed may be a result of an initial search or search criteria. For example, a consumer may search for "laptop computers" and the display may return 30 possible computers that fit the general description of laptop computer (note that in FIG. 5, only three laptops are shown, but any number may be shown and for any type of product).

At process block 110, for each product displayed, any number of product attributes may also be displayed in association with the product. For example, in the case of a laptop computer, the price, the weight, the size, the memory capacity, hard drive capacity, etc. It should be noted that any number of attributes or attribute types may be used, for example, if the products are handbags, then attributes may be material type, brand, color, etc. Each type of product will include its own set of attributes and the attributes will change dynamically based on the associated products.

Furthermore, at process block 115, a selection tool may be positioned next to each attribute. In one embodiment, the selection tool may be a check box or the like. Alternatively, the selection tool may be a slider or similar tool. In the case of a check box, selecting the check box associated with an attribute may indicate that the associated attribute is important to the consumer or has some other intrinsic value (process block 120). For example, if the consumer thinks the price of a certain product is most reasonable, then the consumer may choose to select the check box associated with the price attribute for the product. Similarly, if the consumer believes that a product's warranty is desirable, then the warranty check box for the product may be selected. Any number of attributes may be selected for a given product and the same attribute for multiple products may also be selected. Thus, as attributes for products are selected, ranking value is associated with each product and a "matrix" of product and attribute selections is logged (process block 125).

In an alternative embodiment, if the selection tool is a slider or similar tool, then the "selection" may instead indicate a relative value of the attribute to the consumer. For example, the slider may be incremented in a range between 0 and 100 to indicate a "percentage" value of the attribute. The consumer may slide the slider for an attribute of a first product to 75 (indicating that the attribute is 75% favorable) and the slider for the same attribute for a second product may be set to 50 (indicating that the attribute id 50% favorable). Alternatively, the settings of the slider may be relative to the same attribute among the products. As in the above example, the setting of 75 and 50 may indicate that the same attribute for product one is 25% more favorable that the same attribute for product two. Furthermore, any other suitable weighting may be used.

Accordingly, as the values of each attribute for each product are set (i.e., "checked", "slid", etc.), a running (or real-time) total for each product is maintained. The total may be displayed next to each product or in some other location within the user interface. As such, as the attributes are selected for each product, a score for the products is calculated and displayed (process block 130). For example, if three products are displayed, each with three attributes, and two attributes are selected for products 1, one attribute is selected for product 2, and one attribute is selected for product 3, then the score for product 1 would be two and the scores for products 2 and 3 would be one. Accordingly, as attributes are selected for a product, the score will automatically increase, and alternatively as attributes for products are deselected, the score will be decremented.

In a further embodiment, the list of precuts may be displayed in an ordered list based on their respective ranking values (process block 135). For example, the highest ranked products (i.e., the product with the most selected attributes may be displayed at the top of the list on the top of the user interface page, and the items with less of a ranked score may be displayed further down the list. Accordingly, the consumer is provided with an accurate representation of product rankings based on attributes and factors that are most important to the consumer.

At process block 140, the user has the ability to save the product comparison scoring by name (either an automatically generated name based in part on the contents of the product comparison scoring to be saved, or a unique name selected by the user). The saved product comparison scoring provides the user with the ability to refer back to their decision making process, share their decisions with others, and keep track of the decisions in an orderly manner. Furthermore, the saved product comparison scoring may then be filtered up through the hierarchy (discussed below).

In one embodiment, the interface may display the product comparison page, which displays the products being compared by name in the column headers, along with the ability to perform shopping cart functionality and scoring. In one embodiment, in order to facilitate scoring and ranking as described above, a control table may be included. The control table may be available if a consumer installation decides to enable the product comparison feature for a given catalog section. The control table may include controls that allow the user to select any of the items being compared and add them to a shopping cart. The control table may have the following characteristics: "Select" label may be displayed in the first column header, followed by the product names of the products selected for comparison, followed by a "Hide" icon (allowing the user to dismiss the column from view).

The control table may further include the checkboxes to select the products for a shopping cart that are available for each product displayed. This may be labeled "Select", and by default, upon entering the product comparison page, the "Select" checkboxes to include to shopping cart may be unchecked. When the user places a check mark in the "Select" checkbox, the "Quantity" text entry area may include a value which defaults to one ("1"). Additionally, the "Control" table will include an enterable numeric field labeled "Quantity", allowing the user to specify a quantity to add to the shopping cart, and when a quantity is entered, the "Select" checkbox may also be selected. Further, a score/ranking display may be displayed as a numeric value, labeled as, for example, "Score". This may be based on scoring importance for subsequent attributes.

Figure 2:
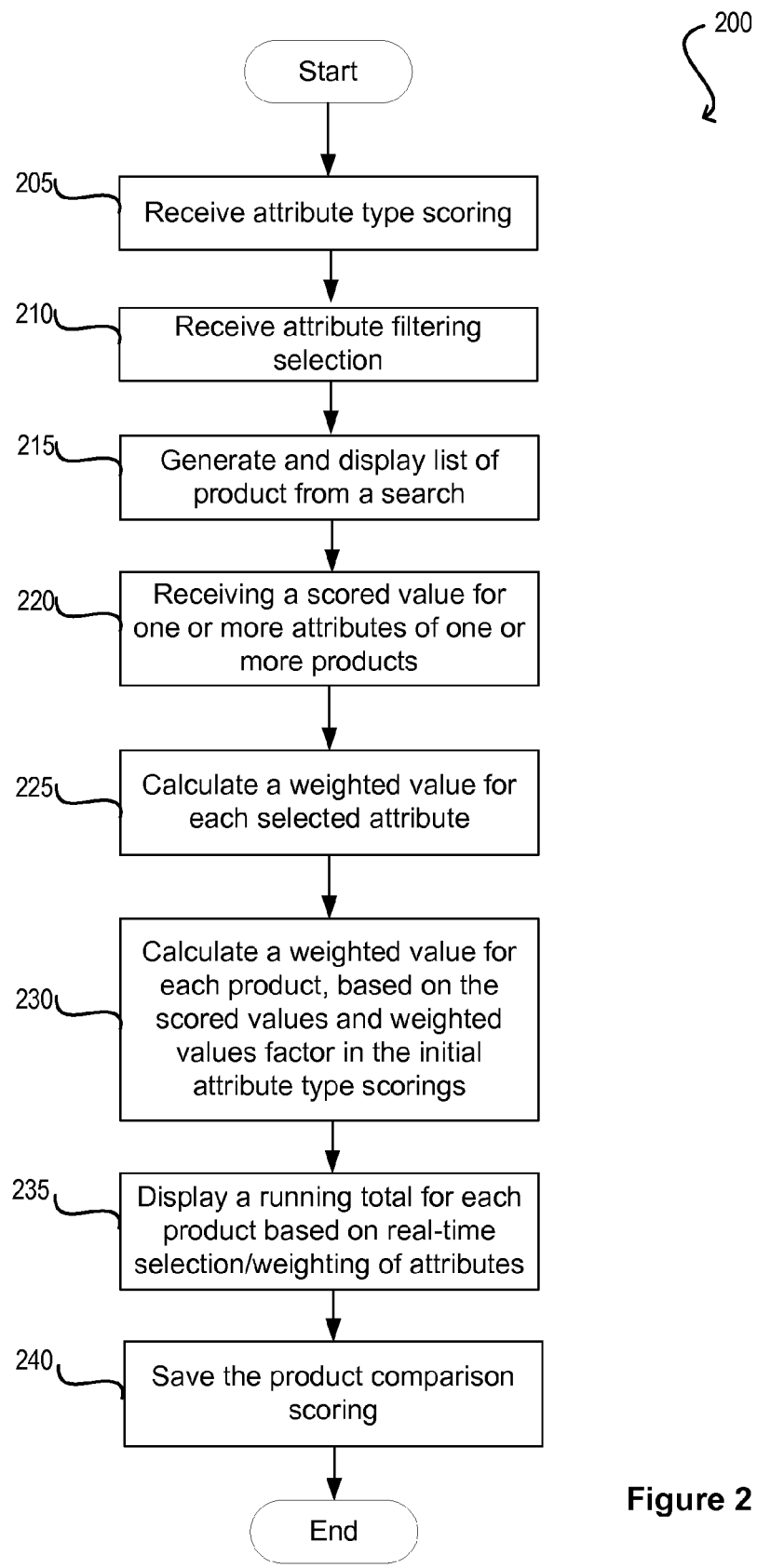
FIG. 2 is a simplified flow diagram illustrating a method 200, according to an embodiment of the present invention.

Referring next to FIG. 2, which illustrates a method 200, according to an embodiment of the present invention. At process block 205, attribute type rankings may be received. In other words, a consumer may desire to "pre-rank" certain attributes with a higher or lower weighted value prior to beginning any searching or selecting of any attributes. For example, a consumer may consider price to be the most important attribute while color is not very important. Therefore, prior to searching such weightings may be provided and attributes may then be scored according to the weighted values.

Furthermore, at process block 210, attribute filtering (or hiding) may indications may be received. For example, a product's weight, size, warranty, etc. may not be important to the consumer, and can thus be "filtered" out of the displayed attributes. Accordingly, only the attributes which are not filtered will be displayed in association with the products.

At process block 215, a list of products and associated attributes may be generated and displayed based on the filtering criteria. As such, some attributes may not be displayed to the consumer based on the provided filtering criteria. Further, as product attribute selections are made for each product, a weighted value for each of the selected attributes is calculated (process block 225), and then the weighted value for each product can also be calculated (process block 230). The total weighted value for each product is calculated based on the collective weighted value of the attribute values for each product. Further, a running "real-time" total can be displayed for each product (process block 235).

At process block 240, the user has the ability to save the product comparison scoring by name (either an automatically generated name based in part on the contents of the product comparison scoring to be saved, or a unique name selected by the user). The saved product comparison scoring provides the user with the ability to refer back to their decision making process, share their decisions with others, and keep track of the decisions in an orderly manner. Furthermore, the saved product comparison scoring may then be filtered up through the hierarchy (discussed below).

Figure 3A:
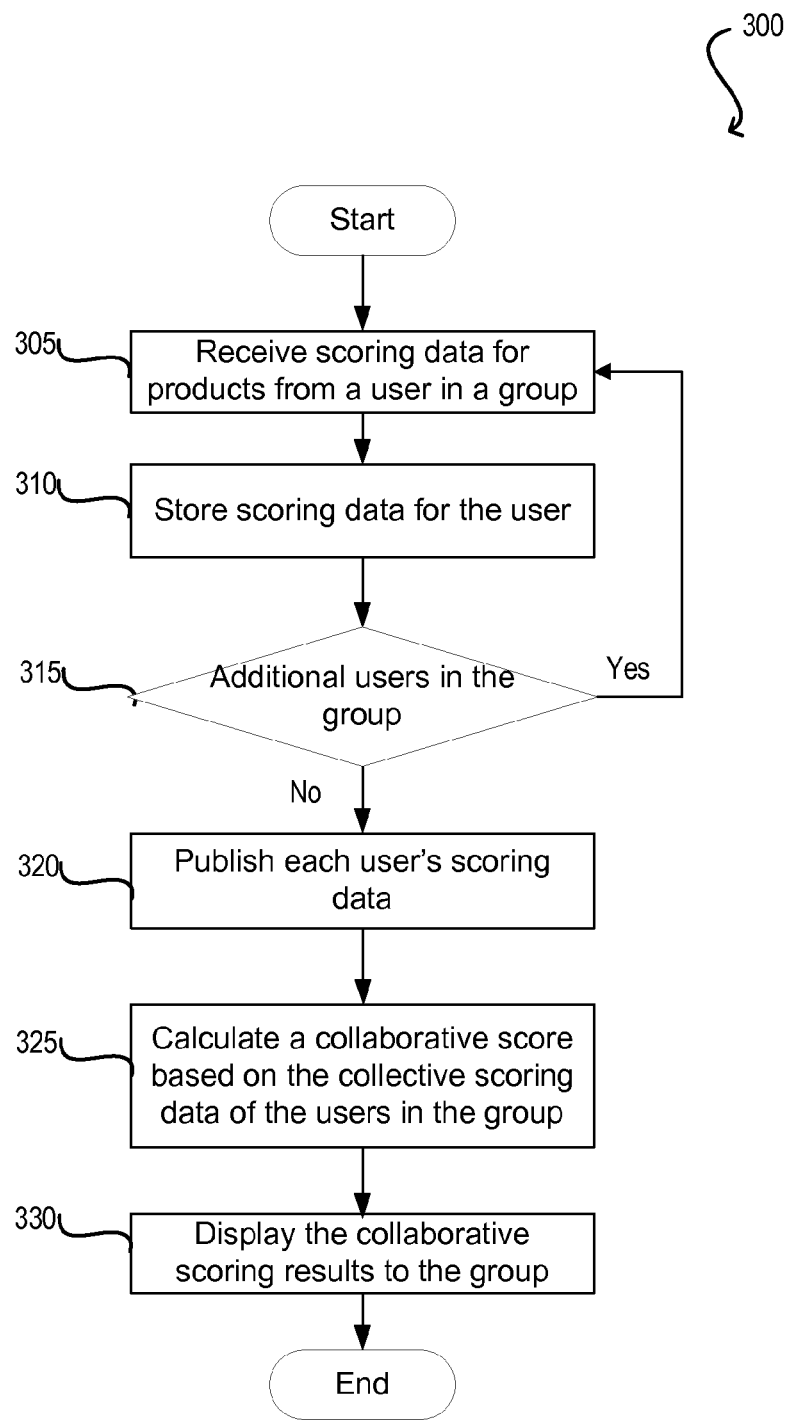
FIGS. 3A and 3B are simplified flow diagrams illustrating methods 300 and 301, according to an embodiment of the present invention.
Figure 3B:
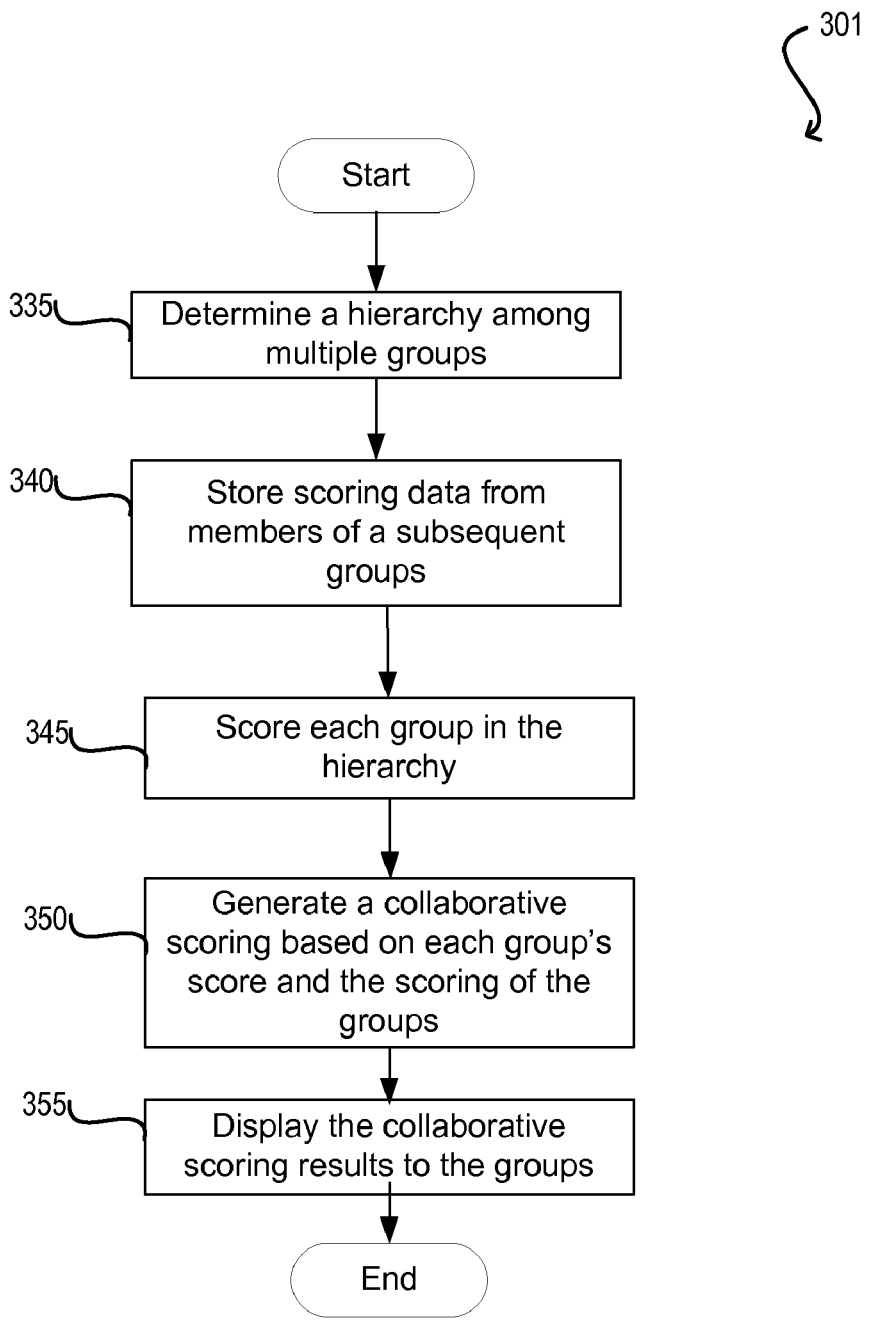

FIGS. 3A and 3B illustrate methods 300 and 301, according to an embodiment of the present invention. At process block 305, ranking data for products from a user in a group may be received. For example, a group may include multiple users each of which provide rankings for multiple products. The group of users may collaborate in the ranking and decision making process of selecting a product(s). As such, each of the user's ranking data from the group can be stored (process block 310), and a determination is made whether additional users still need to provide rankings (decision block 315).

Once all of the product rankings from each of the users in the group is collected, the ranking data for the group may be published (or otherwise displayed) (process block 320). Furthermore, a collaborative score (or ranking) of the products may be determined for the entire group (process block 325). For example, an average of each of the users ranking of each of the products may be determined to provide a "group" ranking of each of the products. Alternatively, a mean or medium of the rankings can be used. Furthermore, the rankings of each user in the group may be weighted differently. For example, the supervisor's (or project lead) rankings may be weighted higher then simply a member of the group. Nonetheless, a collaborative ranking of the various products by the group, as a whole, is generated. Accordingly, at process block 330, the collaborative scoring from the group may be displayed.

FIG. 3B illustrates collaborative scoring based on multiple groups. At process block 335, a group hierarchy may be determined. For example, a management group may be placed above a product group in the hierarchy. As such the higher the groups are placed in the hierarchy, the more weight the group product rankings may be given. For example, if the management group ranks product 1 as a "10" and product 2 as a "6", whereas the development group ranks product 1 as an "8" and product 2 as a "10", the average would be "9" for product 1 and "8" for product 2. However, if, for example, the management group was weighted at 2× that of the development group, then the resulting product rankings would change giving more weight to the rankings of the management group over the development group.

Further, at process block 340, the rankings of each subsequent group in the hierarchy may be stored. Thus, as the groups are ranked (process block 345), the collaborative product rankings can be generated (process block 350). Such collaborative product rankings would be based on the collective rankings of each group in conjunction with the hieratical ranking of the group itself. Therefore, a hieratical collaborative group ranking of the products is achieved. Then, at process block 350, the scoring results can be displayed, and products can be purchased accordingly.

Figure 4:
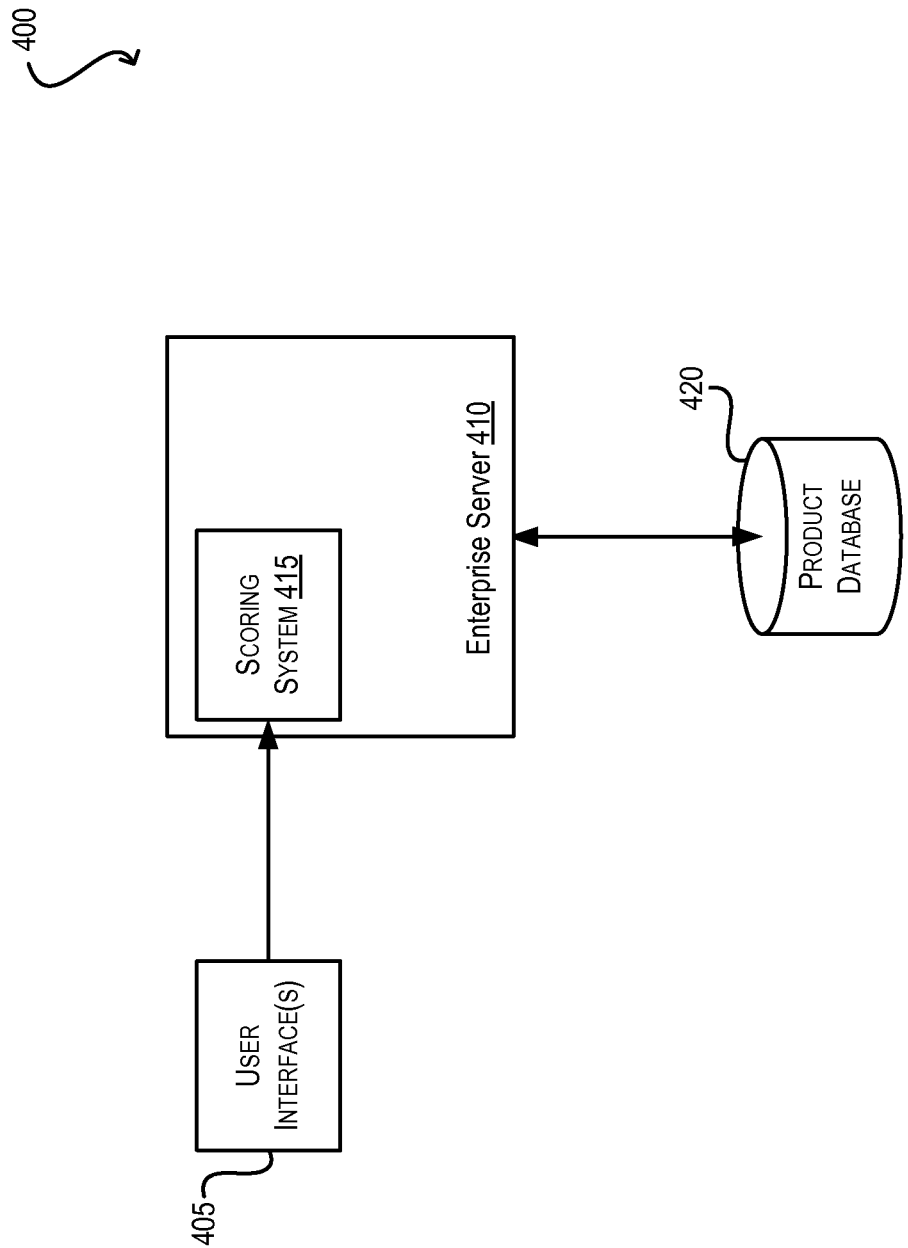
FIG. 4 is a simplified block diagram illustrating a system 400, according to an embodiment of the present invention.

Turning now to FIG. 4, which illustrates a system 400, according to an embodiment of the present invention. In one embodiment, system 400 includes a user interface (or interfaces) 405. The user interface may be a computer display, a Smartphone, a PDA, a portable computer, or the like. In one embodiment, system 400 may be configured to implement any one of methods 100, 200, 300, or 301. The user interface 405 may be in communication with an enterprise server 410, which includes a ranking system 415. Furthermore, the enterprise server 410 may be in communication with a product database 420. Alternatively, the product database 420 may be maintained and implemented by a third-party provider (e.g., an ecommerce host, a web server, etc.).

In one embodiment, user interface 405 may display a user interface which displays a number of products retrieved from the product database 420. The products may be searched and ranked by a consumer (as described above in FIGS. 1-3B). The ranking system 415 may then calculate the rankings of each product and display on interface 405 the real-time ranking values for each product. Accordingly, system 400 is configured to implement the methods described in FIGS. 1-3B.

Figure 5:
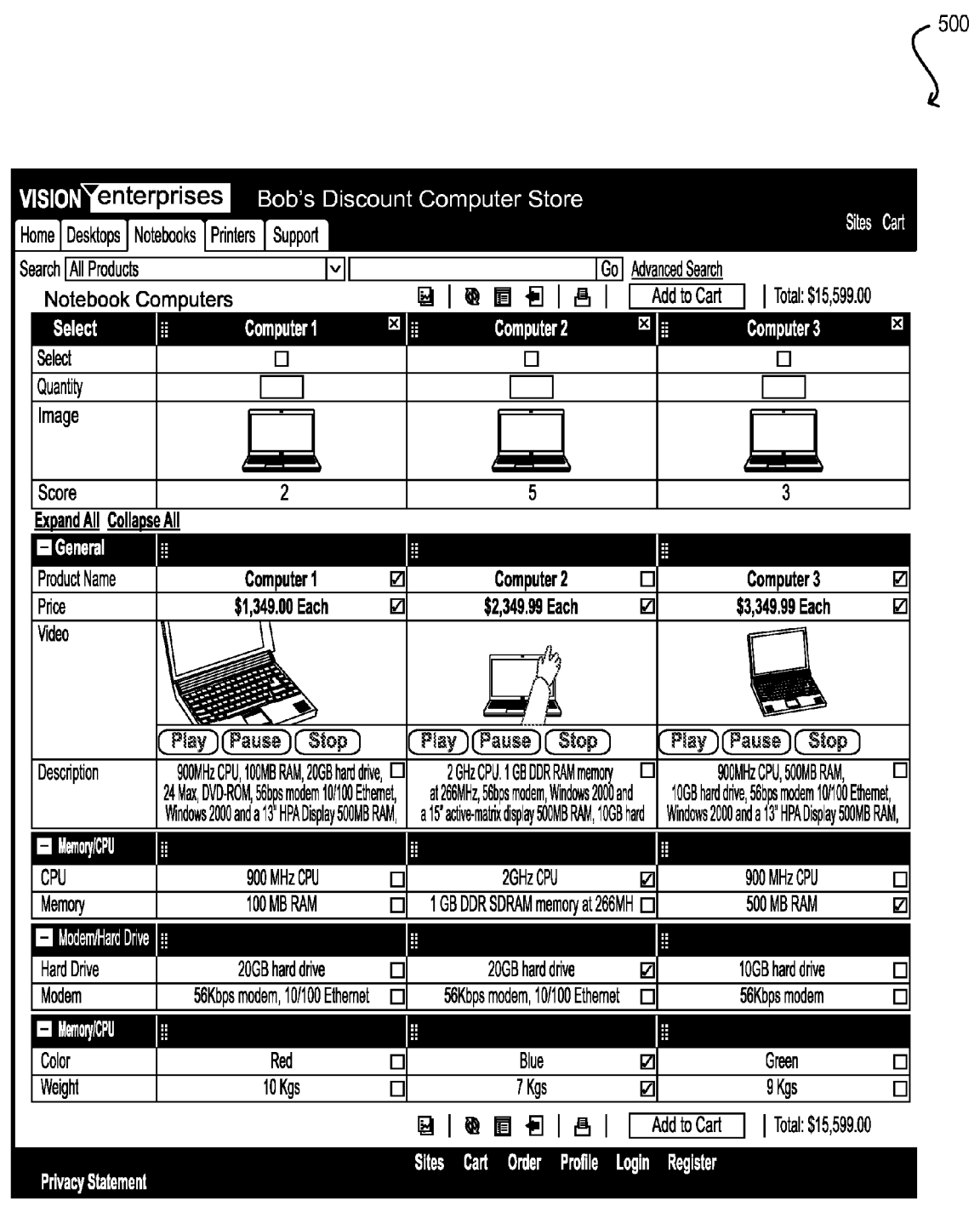

FIG. 5 illustrates a graphical user interface 500, according to a further embodiment of the present invention. The graphical user interface 500 includes one example of a search interface which includes multiple products with multiple product attributes. Further, the interface includes selection tools (check boxes) next to each attribute in order to provide a consumer with ranking capabilities. Additionally, a display next to each product is included to displays the real-time total for the product. As such, the consumer can quickly and easily know how they have raked a product, without thinking back to the selections and rankings they have made. It should be nodded to this interface is merely an example of one possible implementation of the present invention, and other configurations and graphical placements may be used.

In one embodiment, the graphical user interface 500 may provide that when the user has selected two or more products and invokes the product comparison facility, a new page in the same session will be displayed that allows the user to perform certain functions. Some functionality may include: scrolling down the page to view product extended attribute while keeping the product name in the header areas, expanding and collapsing item attributes organized in a "General" section, and expanding and collapsing product extended attributes organized by product extended attribute groups. Additional functionality may include: specifying a product and a product quantity that can be added to the shopping cart, hiding and showing product comparison columns, and performing product scoring for the most desired feature by product. Furthermore, the user interface 500 may provide the features of selecting products to add to the shopping cart and navigate the user to the shopping cart, returning back to the calling page without selecting any products for the shopping cart, and printing the visible contents of the product comparison page.

Figure 6:
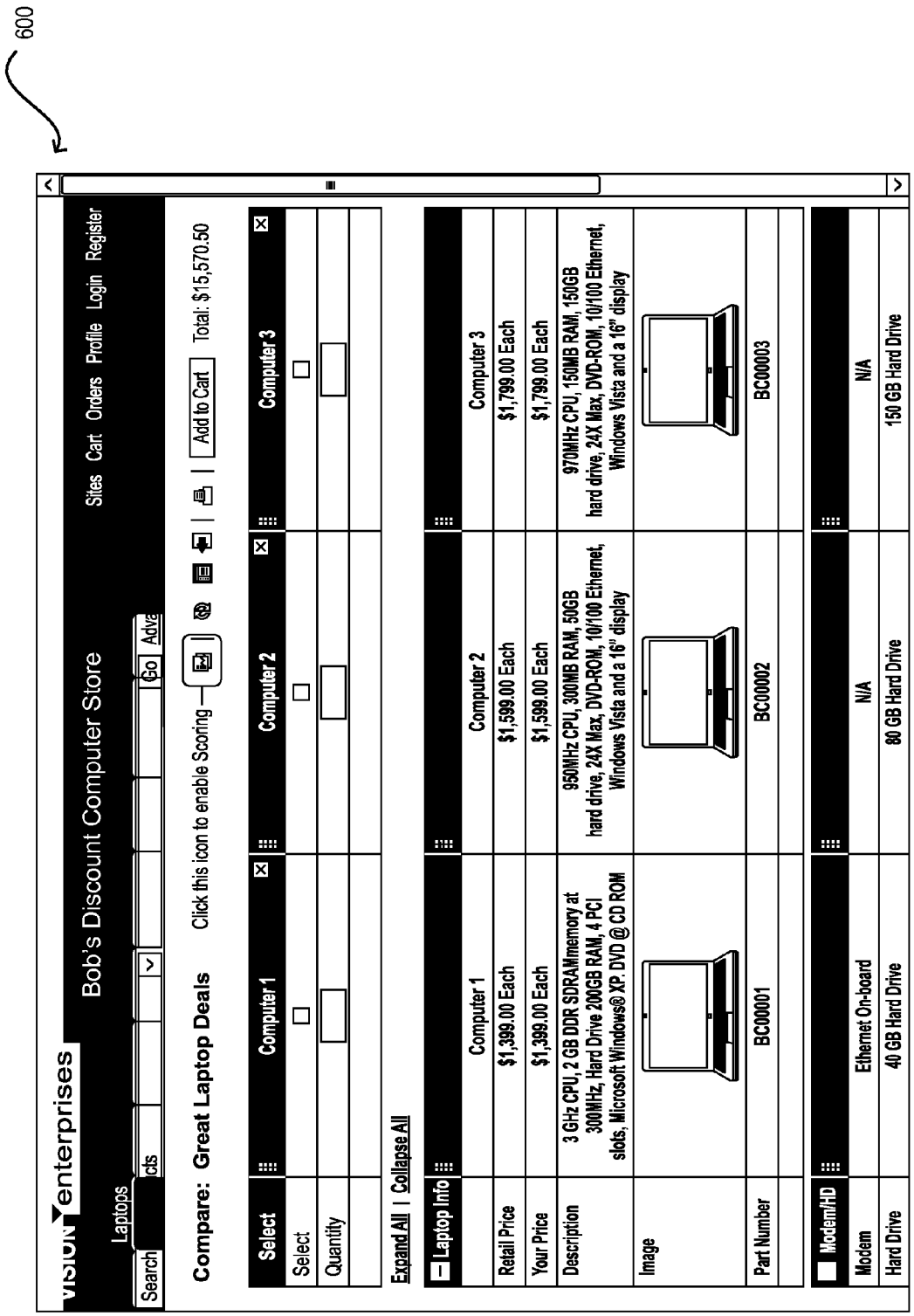
FIG. 6 is a simplified block diagram illustrating a graphical user interface 600, according to an embodiment of the present invention.

FIG. 6 illustrates a graphical user interface 600, according to a further embodiment of the present invention. The graphical user interface 600 includes additional tabs and check boxes which may be used to implement the present invention. For example, the "enable scoring" check box may be toggled in order to hide or show the scoring mechanisms and capabilities of the user interface. Aspects of the present invention may be implemented using the graphical user interface 600.

For the B2B and B2C users, the user interface 600 product comparison page may include one or more of the following irons: a "Scoring" icon that allows the user to rank product features (this feature can be toggled on or off by clicking on the scoring icon). An alternative scoring icon may appear based on whether or not scoring is toggled on or off. A "Refresh All Values" icon that clears the contents of any interactions that the user has made, may also be included. For example, if the user has selected a product, specified a quantity, performed ranking and has received a score, these items would be returned back to their initial value as if the user was entering the product comparison page for the first time.

In a further embodiment, a "Show All" icon that displays all columns (this may be used to retrieve back the columns that may have been hidden). A "Return to Shopping" icon that closes the product comparison page and returns the user back to the calling page without populating the shopping cart, may also be included. Further, a "Print" button that prints the contents of the product comparison page may be included. The print option may print out the content of the page including all item and product extended attribute groups that have been expanded.

Figure 7:
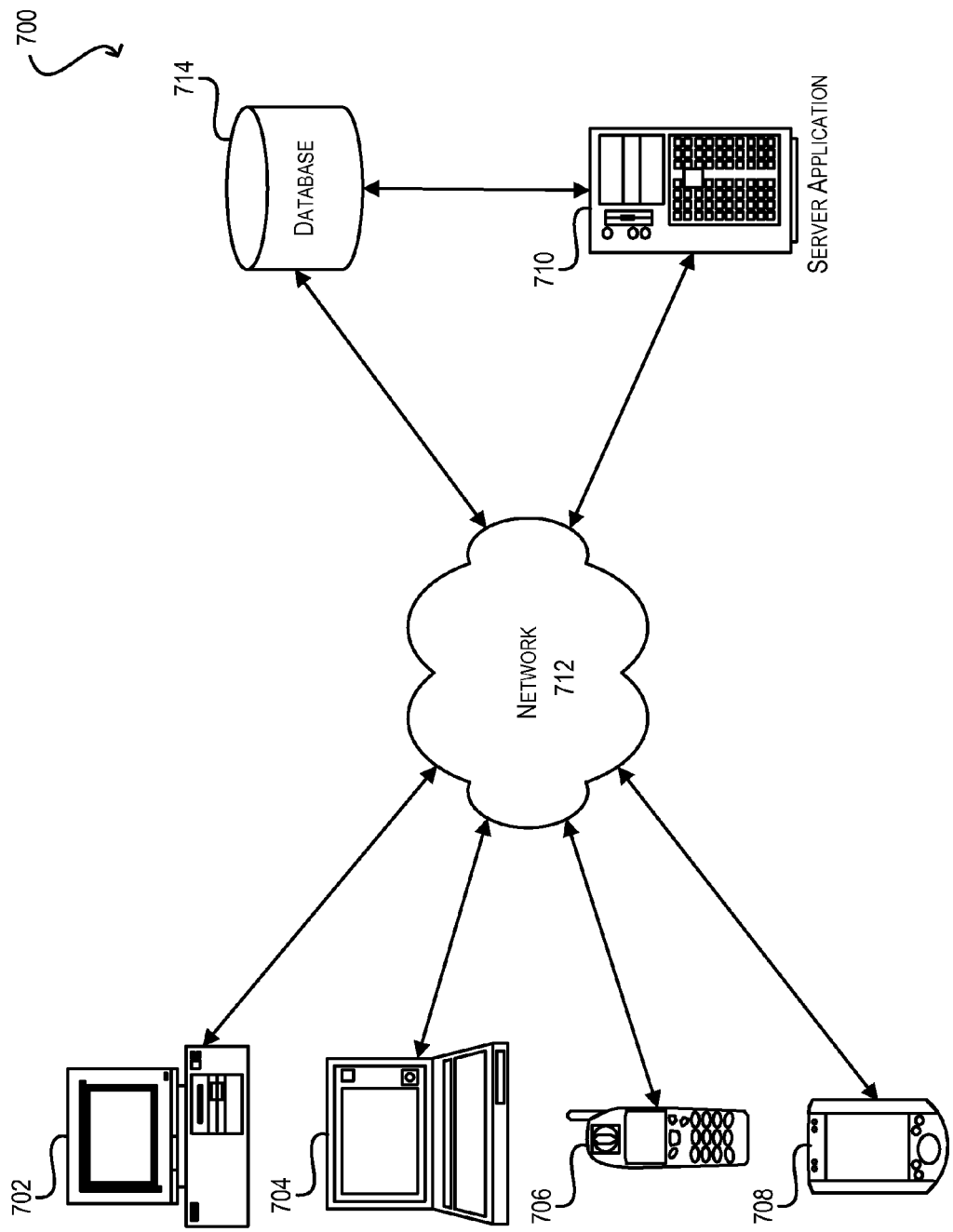
FIG. 7 is a simplified block diagram illustrating physical components of a system environment 700 that may be used in accordance with an embodiment of the present invention.

FIG. 7 is a simplified block diagram illustrating physical components of a system environment 700 that may be used in accordance with an embodiment of the present invention. This diagram is merely an example, which should not unduly limit the scope of the claims. One of ordinary skill in the art would recognize many variations, alternatives, and modifications.

As shown, system environment 700 includes one or more client computing devices 702, 704, 706, 708 communicatively coupled with a server computer 710 via a network 712. In one set of embodiments, client computing devices 702, 704, 706, 708 may be configured to run one or more components of a graphical user interface described above. For example, client computing devices allow user to create and customize network communities, enter search queries, view search results, and others.

Client computing devices 702, 704, 706, 708 may be general purpose personal computers (including, for example, personal computers and/or laptop computers running various versions of Microsoft Windows™ and/or Apple Macintosh™ operating systems), cell phones or PDAs (running software such as Microsoft Windows™ Mobile and being Internet, e-mail, SMS, Blackberry, ™ and/or other communication protocol enabled), and/or workstation computers running any of a variety of commercially-available UNIX™ or UNIX™-like operating systems (including without limitation the variety of GNU/Linux™ operating systems). Alternatively, client computing devices 702, 704, 706, and 708 may be any other electronic device capable of communicating over a network (e.g., network 712 described below) with server computer 710. Although system environment 700 is shown with four client computing devices and one server computer, any number of client computing devices and server computers may be supported.

Server computer 710 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any of a variety of server applications and/or mid-tier applications, including web servers, Java virtual machines, application servers, database servers, and the like. In various embodiments, server computer 710 is adapted to run one or more Web services or software applications described in the foregoing disclosure. For example, server computer 710 is specifically configured to implemented enterprise procurement systems described above.

As shown, client computing devices 702, 704, 706, 708 and server computer 710 are communicatively coupled via network 712. Network 712 may be any type of network that can support data communications using any of a variety of commercially-available protocols, including without limitation TCP/IP, SNA, IPX, AppleTalk™, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol known in the art, and/or any other wireless protocol); and/or any combination of these and/or other networks. In various embodiments, the client computing devices 702, 704, 706, 708 and server computer 710 are able to access the database 714 through the network 712. In certain embodiments, the client computing devices 702, 704, 706, 708 and server computer 710 each has its own database.

System environment 700 may also include one or more databases 714. Database 714 may correspond to an instance of integration repository as well as any other type of database or data storage component described in this disclosure. Database 714 may reside in a variety of locations. By way of example, database 714 may reside on a storage medium local to (and/or resident in) one or more of the computing devices 702, 704, 706, 708, or server computer 710. Alternatively, database 714 may be remote from any or all of the computing devices 702, 704, 706, 708, or server computer 710 and/or in communication (e.g., via network 712) with one or more of these. In one set of embodiments, database 714 may reside in a storage-area network (SAN) familiar to those skilled in the art. Similarly, any necessary files for performing the functions attributed to the computing devices 702, 704, 706, 708, or server computer 710 may be stored locally on the respective computer and/or remotely on database 714, as appropriate. For example the database 714 stores user profiles, procurement information, attributes associated with network entities.

Figure 8:
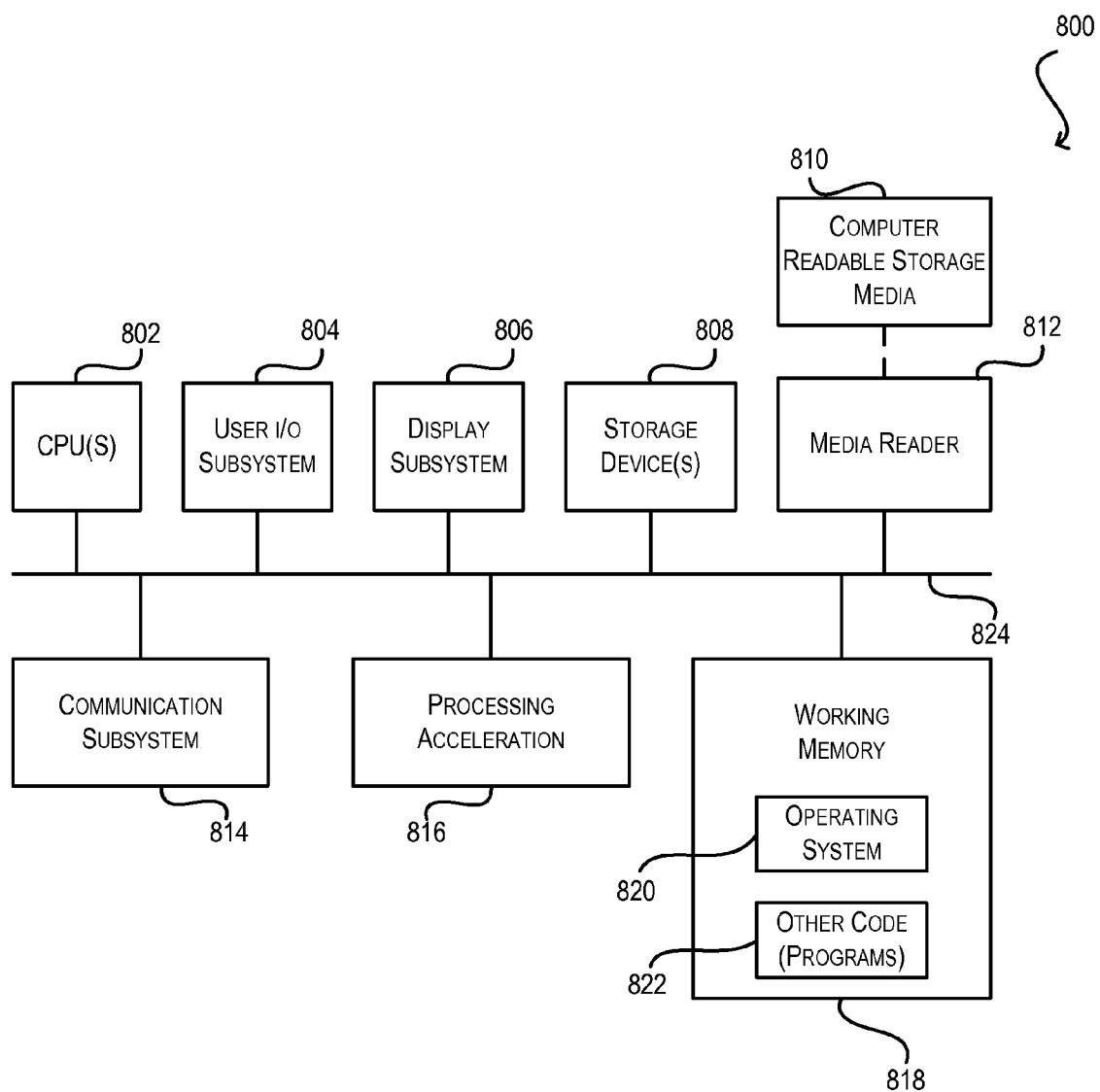
FIG. 8 is a simplified block diagram illustrating the physical components of a computer system 800 that may be used in accordance with an embodiment of the present invention.

FIG. 8 is a simplified block diagram illustrating the physical components of a computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of the computing devices 702, 704, 706, 708, or server computer 710 illustrated in system environment 700 described above. As shown in FIG. 8, computer system 800 comprises hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). For example, the input devices 804 are used to receive user inputs for procurement related search queries. Computer system 800 may also include one or more storage devices 808. By way of example, storage devices 808 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 808. For example, the central processing units 802 is configured to retrieve data from a database and process the data for displaying on a GUI.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage devices 808) comprehensively representing remote, local, fixed, and/or removable storage devices plus storage media for temporarily and/or more permanently containing computer-readable information. Communications system 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable code and associated data structures for one or more of the design-time or runtime components/services illustrated in FIGS. 3 and 6. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 800.

In one set of embodiments, the techniques described herein may be implemented as program code executable by a computer system (such as a computer system 800) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of assisting users in an ecommerce environment, the method comprising:

receiving, at the computing device, by a user an instruction to turn on a scoring feature for a plurality of products, wherein the scoring feature includes a check-box icon next to each of a plurality of attributes associated with the plurality of products which when toggled increments a count for the corresponding product from the plurality of products, wherein the checkbox is a binary selection tool, and wherein when toggled, the weighted value score of the product associated with the selected attribute is incremented by one, and wherein the checkbox, when deselected decrements the weighted value score of the product associated with the deselected attribute by one;

displaying, at a display device of computing device, a user interface of the plurality of products, wherein each of the plurality of associated attributes are displayed in the user interface with an associated check-box icon;

receiving, at the computing device, one or more selections of the check-box icon indicating selection of one or more of the plurality of associated attributes, wherein the one or more selections increment the count for each or the corresponding products;

for each of the plurality of products, calculating, a the computing device, a real-time score total based on the incremented count and displaying the real-time score total for each product within the user interface, wherein the calculating includes:

determining a weighted value for each of the products based on an aggregation of each of the selected plurality of associated attributes of the product;

displaying, at the display device of the computing device, a ranked list of the plurality of products based on the determined weighted values of each of the plurality of products;

storing, by the computing device, each of the rankings of the plurality of products to persist for the user, wherein each of the stored ranked products is stored with a unique name and is retrieved for making comparisons between products and sharing the ranked products with a plurality of users for collaborative review of the plurality of products, wherein the plurality of products are ranked by a plurality of users and each of the plurality of users are members of at least on user group; and generating, at the computing device, a collaborative group ranking based on a collection of the product rankings from each of the users in the group.

2. The method of assisting users in an ecommerce environment as in claim 1, wherein the check-box icon is configured to be positioned in relation to each of the plurality of attributes for each of the plurality of products.

3. The method of assisting users in an ecommerce environment as in claim 1, further comprising logging selections of the plurality of attributes.

4. The method of assisting users in an ecommerce environment as in claim 1, wherein the real-time score for each of the plurality of products is displayed in relation to a corresponding product.

5. The method of assisting users in an ecommerce environment as in claim 1.

6. The method of assisting users in an ecommerce environment as in claim 1, further comprising publishing the collaborative group ranking for other members in other groups to utilize in making ranking determinations.

7. A method of assisting users in an ecommerce environment, the method comprising:
receiving, at the computing device, by a user an instruction to turn on a scoring feature for a plurality of products, wherein the scoring feature includes a check-box icon next to each of a plurality of attributes associated with the plurality of products which when toggled increments a count for the corresponding product from the plurality of products, wherein the checkbox is a binary selection tool, and wherein when toggled, the weighted value score of the product associated with the selected attribute is incremented by one, and wherein the checkbox, when deselected decrements the weighted value score of the product associated with the deselected attribute by one;
receiving, at a computing device, attribute type ranking preferences;
receiving, at the computing device, attribute filtering preferences;
generating, at the computing device, a list of a plurality of products with a plurality of attributes, wherein the list is displayed in a user interface, and wherein the plurality of attributes are filtered based on the attribute filtering preferences;
receiving, at the computing device, ranking indications for the plurality of attributes;
based on the ranking indications and the attribute type ranking preferences, calculating, by the computing device, a weighted value for the plurality of attributes;
based on the calculated weighted value for the plurality of attributes, calculating, by the computing device, a weighted value for each of the plurality of products; and
displaying, in real-time, at a display device of the computing device, the weighted values for each of the plurality of products;
storing, by the computing device, each of the rankings of the plurality of products to persist for the user, wherein each of the stored ranked products is stored with a unique name and is retrieved for making comparisons between products and sharing the ranked products with a plurality of users for collaborative review of the plurality of products, wherein the plurality of products are ranked by a plurality of users and each of the plurality of users are members of at least on user group; and
generating, at the computing device, a collaborative group ranking based on a collection of the product rankings from each of the users in the group.

8. The method of assisting users in an ecommerce environment as in claim 7, wherein the attribute types comprise at least one of: product color, product price, product warranty, product components, or product dimension attributes.

9. The method of assisting users in an ecommerce environment as in claim 7, wherein the filtering preferences indicate which of the plurality of attribute are displayed to a consumer for receiving ranking indications.

10. The method of assisting users in an ecommerce environment as in claim 7, wherein the attribute type ranking preferences indicate attributes a higher or lower weighted value of an attribute when calculating the weighted value of the corresponding plurality of products.

11. The method of assisting users in an ecommerce environment as in claim 7, wherein the user interface includes a selection tool configured to enable or disable ranking capabilities within the user interface.

12. The method of assisting users in an ecommerce environment as in claim 7, wherein the ranking indications are used to populate a weighted.

13. A non-transitory computer-readable medium having sets of instructions stored thereon which, when executed by a computer, cause the computer to:
receive an instruction to turn on a scoring feature for a plurality of products, wherein the scoring feature includes a check-box icon next to each of a plurality of attributes associated with the plurality of products which when toggled increments a count for the corresponding product from the plurality of products, wherein the checkbox is a binary selection tool, and wherein when toggled, the weighted value score of the product associated with the selected attribute is incremented by one, and wherein the checkbox, when deselected decrements the weighted value score of the product associated with the deselected attribute by one
receive product ranking data from a first user group and a second user group for a plurality of products;
determine a hierarchical relationship between the first user group and the second user group, wherein the based on the hierarchal relationship the first user group is above the second user group in the hierarchy;
based on the hieratical relationship, weight the product ranking data of the first user group higher than that of the second user group;
generate a weighted collaborative ranking of the product ranking data based on the weighted product ranking data of the first and second user groups;
display the weighted collaborative rankings of the plurality of products
store each of the rankings of the plurality of products to persist for the user, wherein each of the stored ranked products is stored with a unique name and is retrieved for making comparisons between products and sharing the ranked products with a plurality of users for collaborative review of the plurality of products, wherein the plurality of products are ranked b a plurality of users and each of the plurality of users are members of at least on user group; and
generate a collaborative group ranking based on a collection of the product rankings from each of the users in the group.

* * * * *

UNITED STATES PATENT AND TRADEMARK OFFICE
CERTIFICATE OF CORRECTION

| | | |
|---|---|---|
| PATENT NO. | : 8,375,035 B2 | Page 1 of 1 |
| APPLICATION NO. | : 12/858201 | |
| DATED | : February 12, 2013 | |
| INVENTOR(S) | : Carini et al. | |

It is certified that error appears in the above-identified patent and that said Letters Patent is hereby corrected as shown below:

On Title page, in column 1, item (75), under "Inventors", line 2, delete "Balakishnan," and insert -- Balakrishnan, --, therefor.

In the Drawings:

On sheet 1 of 9, in figure 1, Box 115, line 2, delete "or" and insert -- of --, therefor.

In the Specifications:

In column 3, line 25, after "off" insert -- . --.

In column 6, line 10, delete "(i.e.," and insert -- i.e., --, therefor.

In column 7, line 51, delete "then" and insert -- than --, therefor.

In column 9, line 53, delete "Blackberry, ™" and insert -- Blackberry™, --, therefor.

In the Claims:

In column 12, line 47, in Claim 1, delete "a" and insert -- at --, therefor.

In column 14, line 38, in Claim 13, after "one" insert -- ; --.

In column 14, line 59, in Claim 13, delete "b" and insert -- by --, therefor.

Signed and Sealed this
Fourteenth Day of May, 2013

Teresa Stanek Rea
*Acting Director of the United States Patent and Trademark Office*